Dec. 5, 1950      F. McCURTAIN      2,532,321

ELECTRIC BRAKING SYSTEM

Filed May 20, 1947      2 Sheets-Sheet 1

INVENTOR
FRANK McCURTAIN

BY

*Eamun T. Innes.*

ATTORNEY

INVENTOR
FRANK McCURTAIN
BY
ATTORNEY

Patented Dec. 5, 1950

2,532,321

UNITED STATES PATENT OFFICE 2,532,321

ELECTRIC BRAKING SYSTEM

Frank McCurtain, Los Angeles, Calif., assignor to Wendell R. McKenzie, Montebello, Calif.

Application May 20, 1947, Serial No. 749,395

18 Claims. (Cl. 172—285)

The present invention relates to brakes for ambulatory vehicles in general, and particularly to an electrical brake for such vehicles operated by remote control. More specifically, the invention comprises an operator-controlled electrical brake characterized by the selectively operable means by which the operator can control the braking action from a distance.

Electrical brakes find great usefulness in absorbing heavy continuous loads. Ordinary friction brakes, when used for such loads, are subject to the objection that the energy absorbed must be dissipated in the form of heat and if not adequately accomplished results in the deterioration of the friction elements. Even though such friction brakes be made of highest quality materials failure frequently results. An electrical brake, however, can dissipate its absorbed energy in a resistance element from which the heat may be carried away by the ambient air with no deterioration in the working parts. Given sufficient heat radiation capacity such units can function indefinitely without deterioration.

The braking action is preferably applied to a rotating part of a vehicle and directly to the rotating supporting wheel or axle if that be possible. In multiple unit constructions, as in railroad trains made up of many cars, it is necessary to provide means by which the operator, who would be the engineer in the case of a train, can simultaneously and uniformly apply the braking power throughout the train. In the usual train the brakes are applied by air power, the individual cars being interconnected and the operation of each succeeding car being dependent upon the maintenance of the connections through the preceding cars. Failure of connection in one car can effect the failure of the controls in the entire train, or at least in each succeeding car. Additionally, it is necessary each time the train is being made up to reestablish the car connections and, similarly, to disconnect them each time the train is broken. Poor connections result in poor operating characteristics and even in failure.

With an appreciation of the defects of the prior art constructions, and in order to provide a brake having superior operating characteristics, the braking system of the present invention includes remote control means by which the operator at a spaced point can apply the brakes to any desired degree by selectively operable means under his control and in an entire absence of physical interconnecting means between the various units of the train or between those units and the control unit.

It is an object of the present invention to provide a new and improved electrical braking system for ambulatory vehicles.

It is another object of the invention to provide new and improved control means for electrical brakes.

A further object of the invention is to provide an improved braking system including control means for electrical brakes in which no physical connections are present between the various braking units and the control unit.

A still further object of the invention is to provide a braking system including remote control means for an electrical brake in which the operator may apply the braking power step-by-step and may release it in the same manner, or, if he prefers, may entirely remove the braking power in one step.

These and other more specific objects will appear upon reading the following specification and claims and upon considering in connection therewith the attached drawings to which they relate.

Referring now to the drawings in which a preferred embodiment of the present invention is disclosed:

Figure 1:
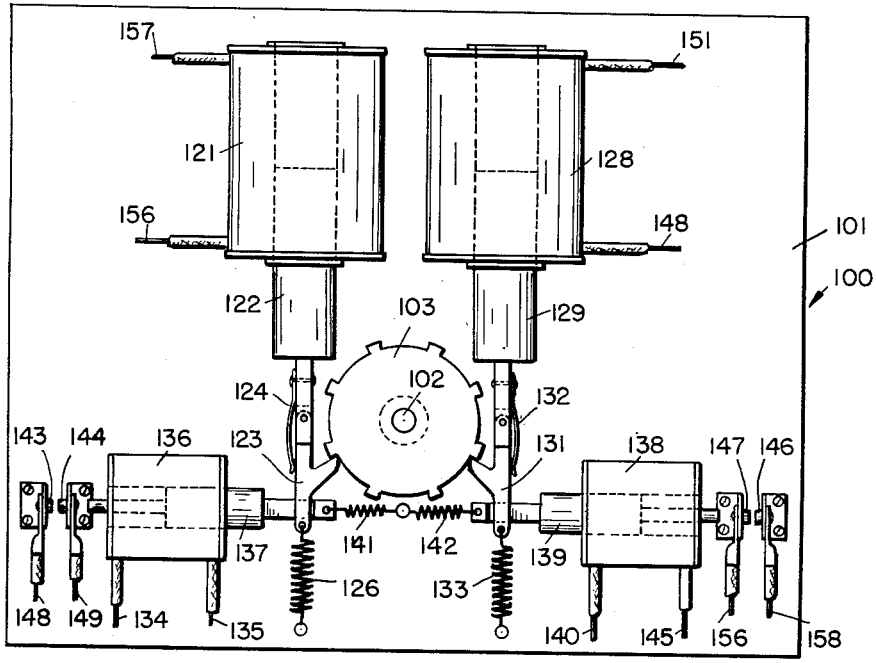
Figure 1 is a side view of the rotary control switch embodied in the braking system comprising the present invention.

The remote control for electrical brakes constructed in accordance with the present invention may be divided, for purposes of explanation, into two principal units, designated generally in the drawing as the control unit S and the operating or braking unit R. The former may be positioned in the cab of the train, or at any preferred point from which the braking action may be controlled, while the operating unit is illustrative of one of many which are located throughout the train in the individual cars, certain parts of each operating unit preferably being connected directly to a rotating wheel or axle. The control unit enables the engineer to energize the braking system and in steps apply the brakes as he sees fit and in an entire absence of any physical connection between the various units. The operating unit includes, in addition to means actually to apply the braking load, means operable by the control means to control those means.

Referring now specifically to the control unit S, it is seen to comprise three operator-operable signal-sending units, preferably of the wave-generating type, indicated by the reference characters A, B and C. Each unit is grounded and also connected to a current-conducting lead 11 from battery 12. Sender A is provided with start and stop buttons or levers, indicated respectively by the reference characters 13 and 14, and the unshown internal mechanism includes any suitable wave-generating circuit, preferably adapted to generate waves of radio frequency and which is active whenever the start button 13 is in its down position and is de-energized by depressing stop button 14 to its down position. Control buttons 13 and 14 are suitably interconnected so that the actuation of one automatically effects the return of the other to its inoperative ready-to-operate position.

Senders B and C are duplicates in the sense that each is provided internally with a signal-sending unit, also preferably of the wave-generating type similar to that of sender A, the waves generated by the three units being of different frequencies. On sender B a pivoted manually-operable lever 17 carries a movable contact 18 adapted to close upon stationary contacts 19 to close the circuit leading from sender B through leads 21 and 22 to the winding of a solenoid 23, and back to the sender through a lead 24. The completion of that circuit effects the generation of a signal which as stated is preferably a wave of predetermined frequency, and simultaneously energizes the winding of solenoid 23 with current provided B by battery 12. Sender C includes a control lever or key 26 carrying a movable contact 27 adapted to close upon stationary contacts 28 to close a circuit leading to and from the sender unit and including leads 29, 31, the winding of a second solenoid 32 and the return lead 33. As in the case of sender B sender C is adapted to send out a high frequency wave which, however, is of a different frequency from that generated by both senders A and B. In addition to the difference in frequencies a further distinct and important difference exists between senders A, B and C comprising the fact that the signal generated by sender A emanates continuously from the time button 13 is depressed until stop button 14 is subsequently actuated, whereas in the case of both senders B and C the signal is generated only during the time the operator actually holds the levers 17 or 26 depressed.

It is intended that the brakes of the braking system comprising the present invention can be applied in steps or increments by the actuation of lever 17 and similarly removed by the repeated actuation of lever 26 of sender C. Accordingly, sending or generating unit B may properly be referred to as the loader unit and unit C as the unloader unit.

It is desirable that indicator means be provided so that at any time the operator may determine visually the exact extent of brake application. The solenoids 23 and 32 previously described are a part of the indicator means. A stationary scale or dial 36 carries a plurality of numbers ranging from zero to as many stages as the brake has in its loading characteristic, the range being 0 to 4 in the illustrated embodiment. A movable pointer 37 is fixedly connected to a rotatable shaft 38 to which is also affixed a star wheel 39. The armatures of solenoids 23 and 32 are both indicated by the reference character 41 and each is provided at its end with a pivoted head 42 formed with a sloping outer surface. Each head 42 is adapted to pivot from the position illustrated into a position in which its underside lies substantially parallel to the armature 41.

Tension springs 43 pull the armatures 41 to their outermost ready-to-operate positions and also hold the heads 42 in their raised positions, as illustrated. Energization of the winding coil of either solenoid effects the downward travel of its armature 41, as viewed in Figure 1, and with it the head 42 at the end thereof. In its downward movement the head catches one of the teeth of the star wheel 39, resulting in the arcuate movement of shaft 38 and the attendant movement of pointer 37. The established relationship is such that the displacement of shaft 38 effected by the cooperation described is sufficient to move the pointer 37 from one brake position number to a second brake position number upon the dial 36. Energization of solenoid 23 causes the movement of the pointer in a clockwise direction to increase the indication of braking load, while energization of solenoid 32 results in the reverse travel. Upon the de-energization of either solenoid, effected by the operator releasing the actuating control levers 17 and 26 as the case may be, results in the upward movement of the solenoid armature 41 under the actuation of the attached spring 43. This movement effects no rotation of the star wheel for the head 42, upon contacting a wheel tooth, pivots inwardly, its sloping upper or outer surface sliding past as it moves to its end position.

Referring now to the operating unit R, the latter is seen to comprise three individual signal receivers, indicated by the reference characters AA, BB and CC, to indicate their relationship to the signal senders A, B and C. Each of these receivers includes a receiving unit tuned to receive the signals generated by the corresponding sender A, B, or C, of the control unit S. Depending upon which of the sending units is actuated by the operator that receiver in tune therewith responds and closes a circuit to effect certain results as will be hereinafter described.

Reference character 51 indicates the rotating part of the vehicle to be braked, as for example, the shaft or axle of a car in a train. The generator which is to generate a current to provide the braking action is indicated by the reference character G and is seen to be grounded and to connect to a conductor 52 in series with a resistance load L which is tapped by a plurality of leads 53, each passing through a normally open switch 54 to ground through a lead 56. Generator G is normally disconnected from the shaft or axle 51 by an electrically operated clutch 57, and it is the function of the sender unit A and the receiver AA to close clutch 57. The function of loader sender B and unloader sender C and their corresponding receivers BB and CC is, through means to be described, to energize and de-energize the solenoids 61, 62, 63 and 64, to control the opening and closing of switches 54. The latter, being connected through taps 53 to the resistance L, function to remove or add segments of the load resistance L, indicated respectively by the reference characters L—1, L—2, L—3 and L—4, in order to vary the current generated by the generator G and so the braking load which it places upon the axle 51.

To close clutch 57, necessary in order to place generator G in operative relationship to the shaft 51 so that it may exert a braking force thereon, receiver AA is connected through leads 67, 69 and 71 to the winding of a solenoid 68 forming a part of the clutch-controlling switch 70, including two movable contacts 72 and 73. The latter are normally held in open position by a coil spring 74 and are connected through leads 76, 77, 78 and 79 to brushes 81 in contact with the slip rings 82 of the winding of clutch 57.

Upon reception by receiver AA of an energizing signal from sender A the winding of switch solenoid 68 is energized by current from battery 86, one side of which is connected by lead 87 to lead 88, common to receivers AA, BB and CC, its opposite side connecting through a lead 89 to lead 91, also common to the receivers. The closing of contact 73 upon stationary contact 92 connects the winding of the clutch 57 directly to the generator G through a lead 93 which includes within its length a rectifier pick-up, indicated generally at 94. The second movable contact 72 to which the other side of the clutch winding connects closes upon a back contact 96 connected directly to one side of battery 86 by a lead 97. Accordingly, closure of the contacts 72 and 73 of clutch-controlling switch 70 effects the sending of current from the battery to the winding of clutch 57 to effect its closure. Thereupon the generator G is clutched to the rotating axle or shaft 51 and immediately current from the generator flows through the lead 93 to the stationary contact 92 through leads 78 and 79 to clutch 57 to retain it closed, through leads 77 and 76 to contact 72, through back contact 96 and lead 97 to lead 89 connecting to a rectifier 98 which is grounded through an adjustable resistance 99. Lead 93 is joined to lead 89 and the current generated by the generator also passes through that lead to the battery 86 and therethrough to the connected lead 89 to the rectifier 98 and so to ground. Generator G is also grounded and these circuits which place the battery and the clutch winding in parallel between the generator and the rectifier enable the battery to be charged during the period the generator is in operation.

As described previously, the operation of the contact or button 13 of starting sender A does not actually place a braking load upon the axle 51 for all of the load resistance switches 54 are open, and it is necessary, in order to place a load upon the generator other than that very inappreciable load represented by the holding current to clutch 57 and the charging current to battery 86, to place the load resistance L in series with the generator. To effect this result the operator depresses lever 17 of loader sender B. Each depression of that lever 17 results in the advancement of the pointer 37, by means previously described, indicating an increase in the braking load, but this is in fact merely an indication of the situation which is effected by means which will now be described.

The signal, preferably a high frequency wave, generated by sender B is received by receiver BB also connected to battery 86 through common leads 88 and 91. Receiver BB, in the manner of receiver AA, contains a suitable electrical circuit and a relay so that upon the reception of each impulse or series of impulses effected by the depression of contact 18 of lever 17 against back contacts 19 the relay is closed and resistance L is initially connected to the generator and then the parts L—1, L—2, L—3 and L—4 are successively removed. This sequential operation is obtained by the actuation of a rotary switch, indicated generally by the reference character 100, and comprising a structure which is best illustrated in Figures 1 to 3, inclusive.

Figure 2:
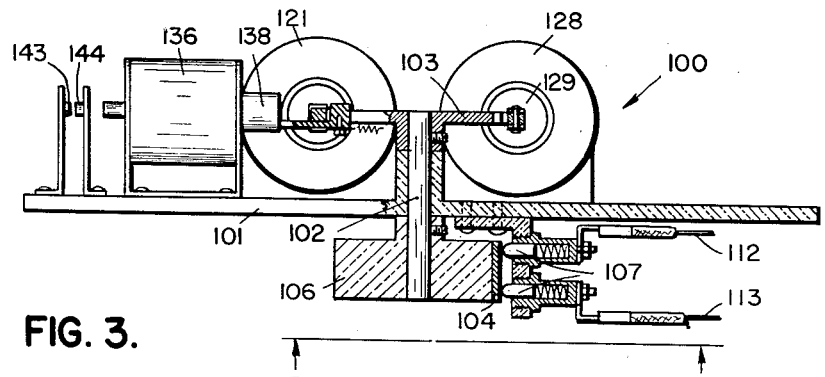
Figure 2 is a top view of the switch illustrated in Figure 1.
Figure 3:
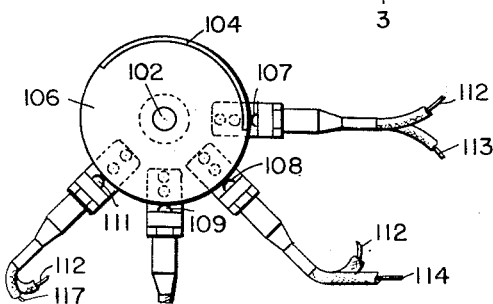
Figure 3 is a view looking in the direction of the arrows upon the lines 3—3 of Figure 2.
Figure 4:
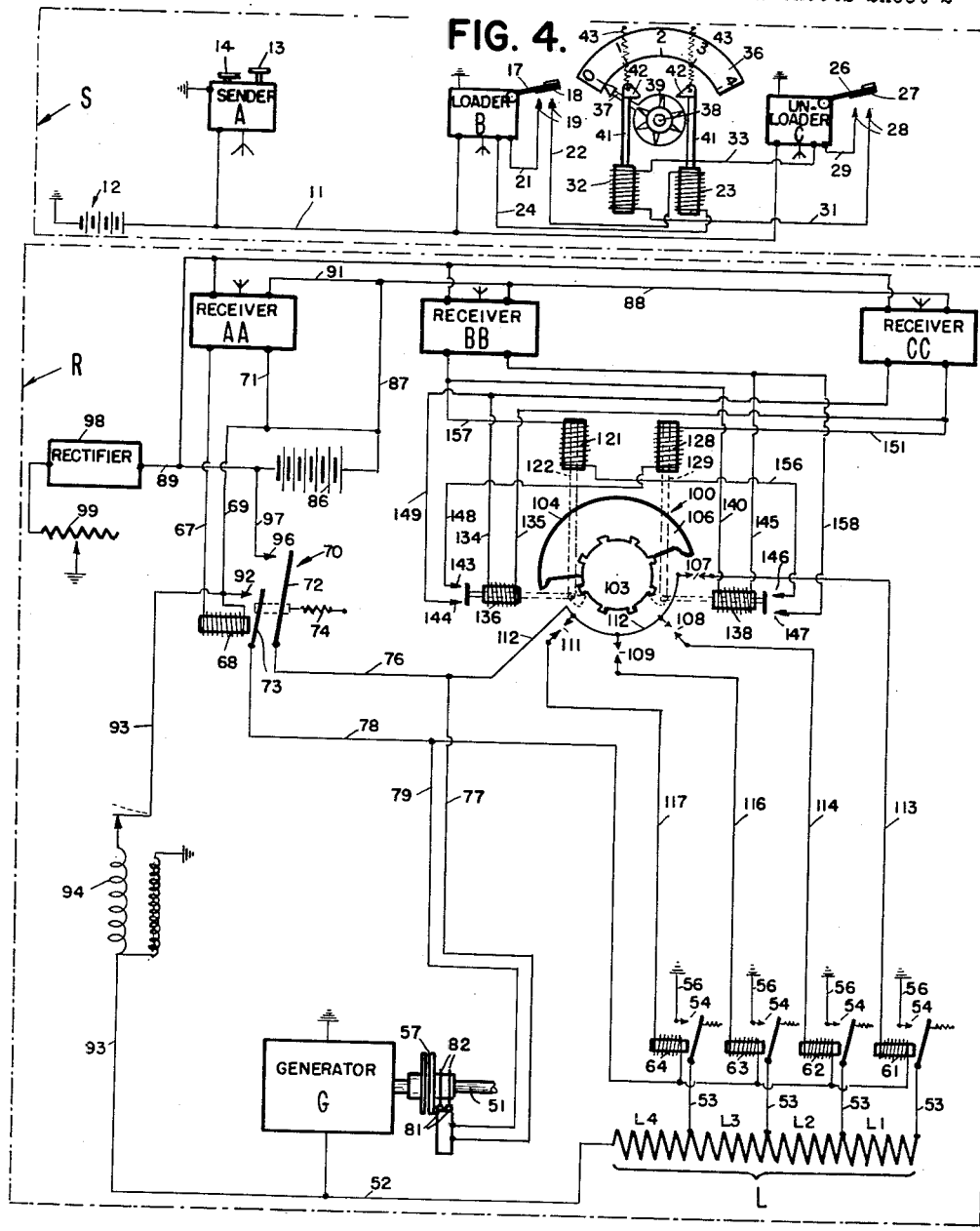
Figure 4 is a diagrammatic illustration of the braking system comprising the present invention.

Referring specifically to Figures 1 to 3, rotary switch 100 is seen to comprise a frame 101 carrying a rotatable shaft 102, while fixed thereto for rotation therewith is a gear 103 and a movable plate contact 104, including an insulating body 106 connected directly to the shaft. Spaced pairs of spring-pressed stationary contacts 107, 108, 109 and 111 are positioned around the periphery of plate contact 104 so that upon its rotation it moves successively into contact therewith. One of each of the pairs of contacts 107, 108, 109 and 111 is connected to a conductor 112 leading directly to junction of leads 76 and 77 and so connected in the circuit of battery 86. The other side of the pairs of contacts are connected by leads 113, 114, 116 and 117, to the windings of solenoids 61, 62, 63 and 64, respectively, of the four resistance tap switches 54. Rotation of contact 104 in a clockwise direction, as viewed in Figure 4, effects the successive closure of pairs of contacts 107, 108, 109 and 111 in the order stated, and, accordingly, the energization of solenoids 61, 62, 63 and 64 in that order. As stated, operation of these solenoids in the order stated effects the initial placing of the entire load resistance L in the generator circuit to ground and then the successive cutting out of portions L—1, L—2 and L—3, respectively.

To effect the rotation of contact 104 of rotary switch 100 a solenoid 121 is provided, the armature 122 of which extends downwardly adjacent gear 103 where its pivoted head 123 is spring-pressed into operative engaging position relative to the gear teeth. A coil spring 126 fixed to the lower end of head 123 exerts a force to retain the armature 122 in its lowermost position unless the coil of solenoid is energized. The energization of solenoid 121, however, effects the upward movement of armature 122, whereupon its hooked head 123 engages a gear tooth to rotate gear 103 clockwise, as viewed in Figures 1 and 4, to advance plate contact 104, to close successively upon contacts 107, 108, 109 and 111.

The brake must be released and this is accomplished under the control of the unloader sender C, and with the cooperation of receiver unit CC, also connected to the common leads 88 and 91 from battery 86. Receiver CC controls solenoid 128 which, with its armature 129, is identical to solenoid 121, with the exception that it is positioned upon the opposite side of the gear 103 and its armature head 131 is spring-pressed into operative position by a leaf spring 132. Upon the energization of solenoid 128 gear 103 is rotated counter-clockwise, as viewed in Figures 1 and 4, each upward movement of armature 129 taking place against the resistance of the return spring 133 corresponding to the aforementioned spring 126.

As is clear from an inspection of Figure 1, the gear 103 cannot rotate in either direction unless the head of the armature of the unenergized solenoid is removed from its operative position relative to the gear 103. For example, armature 122 cannot rotate gear 103 in a clockwise direction unless head 131 of armature 129 is moved to the right and from its underlying position relative to a tooth of gear 103. To effect this displacement of the heads of the two armatures, for either solenoid may be inactive, a pair of secondary solenoids 136 and 138 are operatively connected to receivers BB and CC, respectively. The armature 137 of solenoid 136 is seen to be slotted and slidingly encloses the end of head 123, while the armature 139 is similarly slotted to cooperate in the same manner with head 131. Springs 141 and 142 draw the armatures 138 and 139, respectively, to their inner ready-to-operate positions in which the heads 123 and 131, respectively, are held in gear-engaging position by their springs 124 and 132.

It is desirable that the head of the inactive armature 122 or 129 be removed from its locking position before the remaining head is actuated by its energized solenoid. To accomplish a sequential operation providing this timing pairs of contacts 143, 144 and 146, 147 are provided which are closed by the armatures of solenoid 136 and 138, respectively, when energized. The latter are connected directly to their controlling receivers BB and CC and are energized instantly upon the reception thereby of an actuating signal. The winding of solenoid 136 connects through leads 134 and 135 directly to receiver CC. Similarly, solenoid 138 is connected to receiver BB by leads 140 and 145. Contact 143 is connected by lead 143 to the winding of solenoid 128, itself directly connected by lead 151 to receiver CC. Similarly, contact 144 is connected through lead 149 directly to receiver CC. In a similar manner contact 146 of secondary solenoid 148 is connected by lead 156 in series with the winding of solenoid 121, itself directly connected through lead 157 to receiver BB. Contact 147, on the other hand, connects directly through lead 158 to receiver BB.

The operation of the braking system designed in accordance with the present invention is as follows: Upon approaching a down grade and desiring to place the system in condition for operation, the engineer in the cab of the locomotive presses down upon the start button 13 of sender A. Thereupon a continuous signal such as waves of high frequency, possibly 30,000 cycles per second, is generated. These waves are received by receiver AA effecting the closing of its internal circuit and causing current from battery 86 to flow through the winding 68 of the clutch-controlling switch 70. Immediately contacts 72 and 73 are closed and current from battery 86 is conducted through the connecting leads to the winding of clutch 57. Thereupon generator G is clutched to the car axle 51. No resistance load has yet been placed in the generator circuit but immediately the potential across the generator causes a current to flow through lead 93 to ground at the rectifier pick-up 94. The normally open switch of rectifier pick-up 94 is thereby closed and current then flows on through lead 93 to the battery 86 through lead 69, rectifier 98 being connected between the battery and ground in lead 89 in order to rectify the current and to accomplish battery charging. As long as the generator continues to operate this charging action continues. The closing of contacts 72 and 73 connect the generator to the winding of the clutch 57 which is connected, as previously described, to those contacts. The generated current through the clutch also flows to ground through rectifier 98 via leads 77, 76, contacts 72, 96, and leads 97 and 89.

No braking force is exerted upon the car axle until the operator first presses upon the key or lever 17, thereby generating a signal which may be a high frequency wave of possibly 40,000 cycles per second to which frequency the receiver unit BB responds. The exact signal or its frequency is not important. It is important, however, that it be a signal different from that to which receivers AA and CC respond. The response of receiver BB to its signal is to close its internal circuit, whereupon current from the battery 86 connected thereto is effective through leads 140 and 145 to energize solenoid 138 which immediately pulls the head 131 of the armature of solenoid 128 from its normal position and also closes the contacts 146 and 147. Immediately current flows through the solenoid 121 to actuate its armature 122 and to rotate the gear 103 in a clockwise direction, as viewed in Figures 1 and 4, whereupon the movable contact 104 of switch 100, which also rotates with shaft 102 to which gear 103 is connected, closes the first pair of contacts 107. Current then flows from the lead 112 connected to battery 86, across contact 107 and through lead 113 to solenoid 61. The switch 54 operated by the latter thereupon closes and the entire load resistance L is placed in series with the generator which thereupon generates a minimum current and places a minimum braking load upon axle 51. The release by the operator of key 17 ends the generation of the high frequency current and effects the opening of the internal circuits of receiver BB. Solenoids 138 and 121 are immediately de-energized and their armatures are returned to their original inactive positions by the springs 142 and 126, respectively, connected thereto. Heads 131, under the force exerted by leaf spring 132, also returns to its aligned operative position adjacent gear 103. Movable contact 104, however, remains in its new position. Successive depressions of key 17 each effect the same result and with each depression the rotary contact 104 is advanced so as to energize successively solenoids 62, 63 and 64, resulting, respectively, in the cutting from the load circuit of resistance L—1, L—2 and L—3, and finally leaving only minimum resistance L—4, in which event the current generated by the generator is a maximum and the unit is exerting its maximum braking force.

Each depression of the lever 17 has also resulted in energization of the solenoid 23 in the control unit S by current from battery 12 as previously described, and pointer 37 has successively moved from the zero position to positions 1, 2 and 3, the latter indicating a maximum load in the form illustrated although, of course, as many steps may be provided as desired.

Assuming it becomes desirable to reduce the braking effect or to return it in steps to zero, the operator depresses key 26, whereupon sending unit C generates a signal, possibly a wave having a frequency of 50,000 cycles per second, and effecting in response in receiver CC. Each energization of receiver CC effects the energization of secondary solenoid 136 and primary solenoid 128 controlled thereby through contacts 143 and 144. Thereupon gear 103 is returned step-by-step to its initial zero position, the operation of the solenoids being similar to that described for solenoids 138 and 121 in the loading operation, and head 123 being displaced in the identical manner of head 131.

During the operation of the system and with the generator connected to the axle 51, a charging current is sent through battery 86 as described.

A primary distinction exists between sender A and senders B and C, in that the signal generated by sender A is continuous, whereas the signal generated in senders B and C continues only during the time period their sending keys are depressed. So long as the starting key or button 13 remains depressed, and it remains in that position until returned to its initial position by the depression of cut-off or stop button 14, sender unit A generates its high frequency signal to which receiver AA is responsive.

If at any time during the braking operation it is desired entirely to remove the braking force in one step rather than step-by-step it is necessary only to depress the cut-off button 14, whereupon signal generation by sender A is stopped and the circuit of receiver AA opens. Solenoid 68 of switch 70 is de-energized and the latter opens, whereupon current to the clutch 57 is cut off and the generator is immediately disconnected from the axle 51. Should this operation take place before all of the resistance has been cut out and the pointer 37 returned to its initial zero position the operator would need only energize the unloader key 26 successively to effect the return movement of the movable contact 104 and pointer 37 to their initial starting positions.

While the particular apparatus herein shown and described in detail is fully capable of attaining the objects and providing the advantages hereinbefore stated, it is to be understood that it is but illustrative of the presently preferred embodiment of the invention and that it is not intended to limit the scope of the invention to the details of construction or design herein disclosed, other than as set forth in the appended claims.

I claim:

1. In a braking system including an electric generator connected to a vehicle to be braked to provide a braking load thereon, a resistance load connected in the circuit of said generator, and switch means to cut said resistance in and out of the circuit in increments, control means comprising: means to actuate said switch means to add and to withdraw resistance including a signal responsive unit responsive to a signal of one frequency to effect the addition of resistance and a second signal responsive unit responsive to a signal of a second frequency to effect the withdrawal of resistance, signal sending means physically spaced from said responsive units adapted selectively to send signals to effect responses in each of said units, and means to indicate to the operator the braking adjustment at any given time.

2. In a braking system including an electric generator connected to a vehicle to be braked, a resistance load connected in the circuit of said generator, and switch means to cut said resistance in and out of the circuit in increments, control means comprising: means to actuate said switch means to add and to withdraw resistance including a signal responsive unit responsive to a signal of one frequency to effect the addition of resistance and a second signal responsive unit responsive to a signal of a second frequency to effect the withdrawal of resistance, signal sending means physically spaced from said responsive units adapted selectively to send signals to effect responses in each of said units, and indicator means electrically connected to said signal sending means and actuated thereby to indicate the resistance load setting.

3. In a braking system including an electric generator connectible to a moving part of a vehicle to be braked to apply a braking load, a resistance load connected in the circuit of said generator, a plurality of switches to short-circuit segments of said resistance serially, a master controller to control the energization of said plurality of switches, means including a first signal responsive unit to adjust said controller to operate said plurality of switches to add segments of said resistance and a second signal responsive unit to adjust said controller to operate said plurality of switches to withdraw segments of said resistance, and signal sending means physically spaced from said signal responsive units to generate high frequency waves to which said responsive units respond.

4. In a braking system including an electric generator connectible to a moving part of a vehicle to be braked to apply a braking load, a resistance load connected in the circuit of said generator, a plurality of switches to short-circuit segments of said resistance serially, a master controller to control the energization of said plurality of switches, means including a first signal responsive unit to adjust said controller to operate said plurality of switches to add segments of said resistance and a second signal responsive unit to adjust said controller to operate said plurality of switches to withdraw segments of said resistance, and normally inoperative signal sending means physically spaced from said signal responsive units to generate high frequency signal waves to which said units selectively respond and including operator-operated control means.

5. In a braking system including an electric generator, electric clutch means to connect said generator to a rotating part of a vehicle to be braked, a variable resistance load in the circuit of said generator, and means to actuate said clutch and to vary said resistance including: an electric circuit to conduct an actuating current to said clutch under the control of a signal responsive unit, a second electric circuit including means to vary said resistance under the control of a second signal responsive unit, and signal sending units physically spaced from said responsive units and adapted to generate signals to which said responsive units respond under the control of an operator.

6. The construction recited in claim 5 characterized in that said signal sending units include a first unit to generate a continuous signal to its responsive unit controlling the clutch.

7. The construction recited in claim 5 characterized in that said second electric circuit includes means to increase the resistance and in that said signal responsive unit is responsive to a signal of different frequency than the signal responsive unit of the first circuit.

8. The construction recited in claim 5 characterized in that said second electric circuit includes means to decrease the resistance and in that said signal responsive unit is responsive to a signal of different frequency than the signal responsive unit of the first circuit.

9. The construction recited in claim 5 characterized in that a battery is connected in said circuit to provide current thereto and in that said generator is connected to said battery and to a rectifier to deliver a charging current to said battery during operation.

10. In a braking system, a brake comprising an electric generator, a loading control circuit for said generator including a plurality of high frequency signal receiving means, a clutch to connect said generator to a rotating part of the vehicle to be braked, a control circuit for said clutch including a high frequency signal receiving means, and means to selectively energize said high frequency signal receiving means to vary the load on said generator and to open and close said clutch and including operator-controlled signal sending means spaced physically for said signal receiving means.

11. The construction recited in claim 10 characterized in that separate signal sending means are provided to operate said clutch, to increase the load on the generator, and to decrease said load.

12. In a braking system, a normally disconnected brake, means to connect said brake to its load including a radio frequency wave receiving unit, means to vary the load on said brake including a second radio frequency wave receiving unit, and control means for said means to connect said brake and for said means to vary the load thereon including a first radio frequency wave generating unit to generate a continuous signal controlling said means to connect said brake and a second radio frequency wave generating unit to generate intermittent signals to actuate said second wave receiving unit controlling the load on said brake.

13. In a braking system, a brake adapted to be connected to and disconnected from a load, means controlling the connection of said brake to its load including a first radio frequency wave receiving unit, means to vary the load on said brake including a second radio frequency wave receiving unit, a first radio wave generating unit generating a continuous signal received by said first receiving unit to maintain the relationship of said brake to said load, and a second radio wave generating unit to send signals to said second receiving unit to control the variations in said load.

14. The construction recited in claim 13 characterized in that said second wave generating unit and said second wave receiving unit vary said load only by the addition of load and in that a third wave generating unit and a third wave receiving unit vary said load by the removal of load.

15. In a control system for the electric braking system of an ambulatory vehicle which braking system includes an electric generator clutch connected to a rotating part of the vehicle and electrically connected to a variable resistance; a control circuit for said clutch including electrically energized operating means under the control of means including a radio frequency wave responsive unit, means to cut said resistance in and out including a plurality of electrically actuated short circuiting switches and a master controller to control the energization of said switches, and means to adjust said controller including first and second radio frequency signal responsive units responsive to signals of different frequencies.

16. In a control system for the electric braking system of an ambulatory vehicle which braking system includes an electric generator clutch connected to a rotating part of the vehicle and electrically connected to a variable resistance; a control circuit for said clutch including electrically energized operating means under the control of means including a radio frequency wave responsive unit, means to cut said resistance in and out including a plurality of electrically actuated short circuiting switches and a master controller to control the energization of said switches; and means to adjust said controller including electrically actuating means to move said controller in opposite directions forming a part of circuits including radio frequency wave responsive units responsive to waves of different frequencies.

17. The construction recited in claim 16 characterized in that one of said electrical actuating means to move said controller in one direction is in the circuit of one of said responsive units and in that a second electrical actuating means is in the circuit of a second responsive unit whereby said controller is adjusted in opposite directions by radio waves of different frequencies.

18. The construction recited in claim 17 characterized in that said electrical actuating means comprises a solenoid connected to said controller to exert a moving force thereon upon being itself energized.

FRANK McCURTAIN.

REFERENCES CITED

The following references are of record in the file of this patent:

UNITED STATES PATENTS

| Number | Name | Date |
|---|---|---|
| 264,663 | Edison | Sept. 19, 1882 |
| 994,159 | Henderson | June 6, 1911 |
| 1,064,749 | Leonard | June 17, 1913 |
| 1,157,028 | Noble | Oct. 19, 1915 |
| 1,293,929 | Riley | Feb. 11, 1919 |
| 1,604,415 | Kane | Oct. 26, 1926 |
| 2,025,106 | Hirshfeld | Dec. 24, 1935 |
| 2,066,131 | White | Dec. 29, 1936 |
| 2,093,074 | Dickinson | Sept. 14, 1937 |
| 2,248,577 | McNairy | July 8, 1941 |
| 2,365,982 | Trofimov | Dec. 26, 1944 |
| 2,393,892 | DeGanahl | Jan. 29, 1946 |